United States Patent [19]
Bergholm et al.

[11] 4,169,173
[45] Sep. 25, 1979

[54] METHOD FOR COLOR-MARKING LOGS

[75] Inventors: Lennart Bergholm; Bo Jonsson, both of Umeå, Sweden

[73] Assignee: Umeå Mekaniska AB, Umeå, Sweden

[21] Appl. No.: 729,687

[22] Filed: Oct. 5, 1976

[30] Foreign Application Priority Data

Oct. 15, 1975 [SE] Sweden ............................ 7511554

[51] Int. Cl.² .......................................... B05D 3/12
[52] U.S. Cl. ..................................... 427/284; 83/369; 118/40; 144/3 N; 144/312; 427/291; 118/668; 118/704
[58] Field of Search ..................... 118/8, 7, 9, 40, 41, 118/42; 427/291, 284, 292; 209/111.6, 580; 144/2 N, 3 N, 312; 83/369

[56] References Cited
U.S. PATENT DOCUMENTS

| | | | |
|---|---|---|---|
| 1,288,083 | 12/1918 | McDonough | 144/3 N |
| 3,017,850 | 1/1962 | Whittier | 118/9 |
| 3,021,006 | 2/1962 | Beckman, Jr. | 209/111.6 |
| 3,674,207 | 7/1972 | Carbonetti, Jr. | 118/7 X |
| 3,720,247 | 3/1973 | Lindblom | 83/369 X |
| 4,014,286 | 3/1977 | DeZurik | 118/8 X |

OTHER PUBLICATIONS

Brown, Nelson C., *Lumber*, New York City, John Wiley & Sons, Inc., 1947, p. 93.

*Primary Examiner*—Evan K. Lawrence
*Attorney, Agent, or Firm*—Burns, Doane, Swecker & Mathis

[57] ABSTRACT

A method of color marking logs wherein the logs are cut to predetermined lengths in a processing machine and are colored coded with one or a combination of different colors after the cutting has taken place. The colors correspond to predetermined information related to the log such as its length and are applied to an end portion of the log during a free fall after cut-off by means of automatically controlled paint sprayers. A sprayer for color marking the log is preset prior to its actuation by a signal corresponding to the predetermined log length.

1 Claim, 4 Drawing Figures

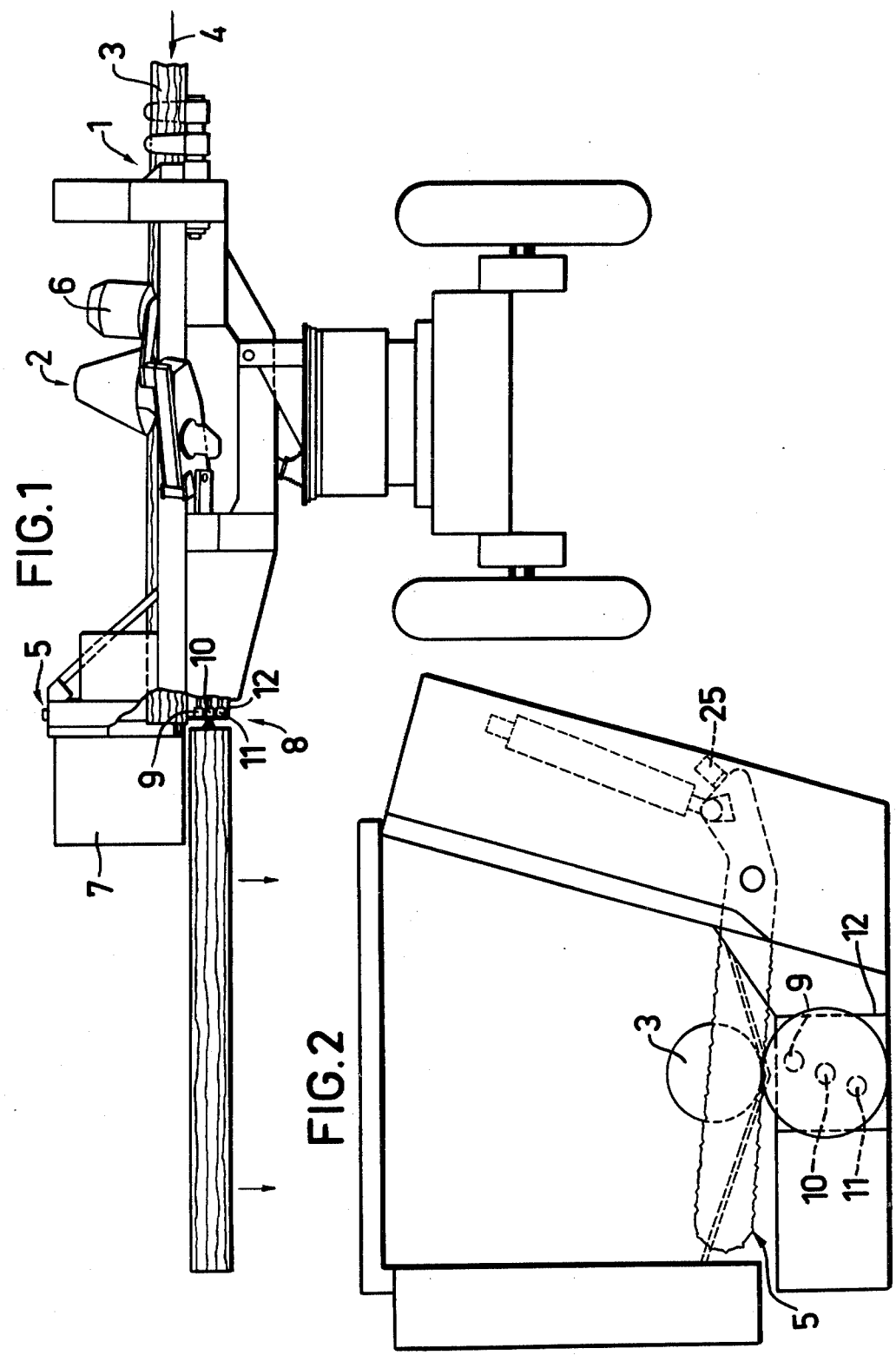

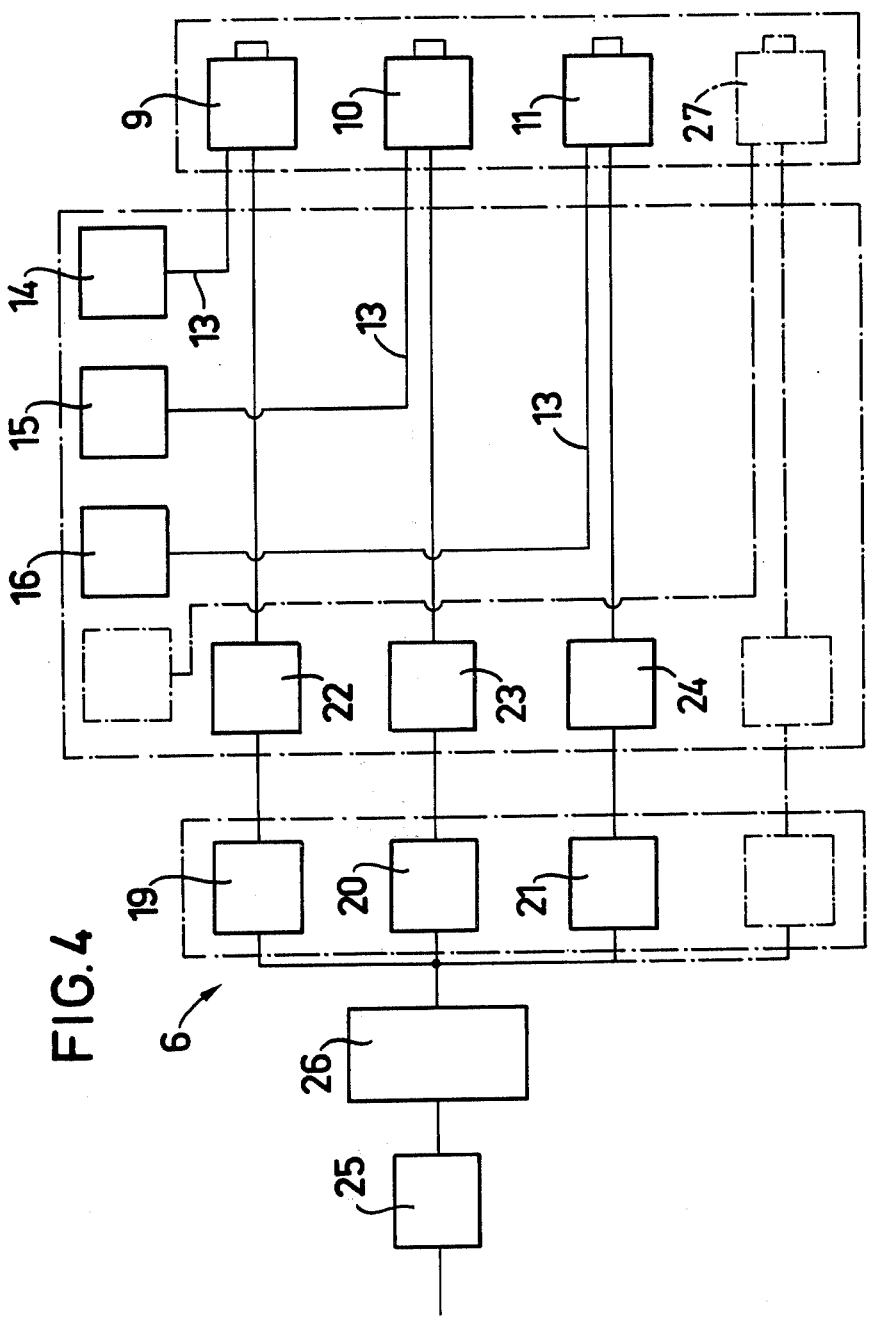

METHOD FOR COLOR-MARKING LOGS

BACKGROUND OF THE INVENTION

This invention relates in general to the marking of logs and more precisely to a method used with a processor, multi-process machine or other machines for processing or working trees to color-mark logs, preferably timber, fed into the machine.

The present invention is based on an aim not yet realized to simplify and facilitate, and thereby to render cheaper, the measuring of wood, and primarily of timber. This wood measuring or volume determination of specially timber has been and still is carried out more or less manually and involves a highly tedious and labour-requiring procedure. It was tried to simplify and rationalize this procedure, but so far without satisfactory result from a measurement technical aspect as regards timber.

SUMMARY OF THE INVENTION

This aim has now been realized, at least for logs crosscut to length in processors and similar machines, by the method according to the present invention, which also is of such a nature that it does no affect the capacity of the machine and can be carried out fully automatically. The novel and characterizing features of the invention substantially comprise the steps of moving the log crosscut in the processor with one end piece past a marking unit consisting of at least one and preferably several coloring means, which during the passage of the log end piece automatically mark the passing end piece with a color or a combination of colors corresponding to at least one item of predetermined information on the passing log. By controlling, for example, the marking unit in response to a dimension transmitter and further by arranging each color or combination of colors to represent a predetermined dimensional size, for example length, the method according to the invention can be utilized in a very rational and simple manner for length-marking all logs discharged from a processor, whereby subsequent timber measuring is facilitated and simplified to a high degree, because each log carries at one end piece already accurate information on its length.

BRIEF DESCRIPTION OF THE DRAWINGS

The invention is described in greater detail in the following, with reference to the accompanying drawings, in which FIG. 1 shows a processor equipped for the length-marking of logs by the method according to the invention.

FIG. 2 is on a larger scale a schematically shown section along the line II—II in FIG. 1, FIG. 4 is a wiring diagram for the device according to the invention.

DESCRIPTION OF THE PREFERRED EMBODIMENTS

Figure 3:
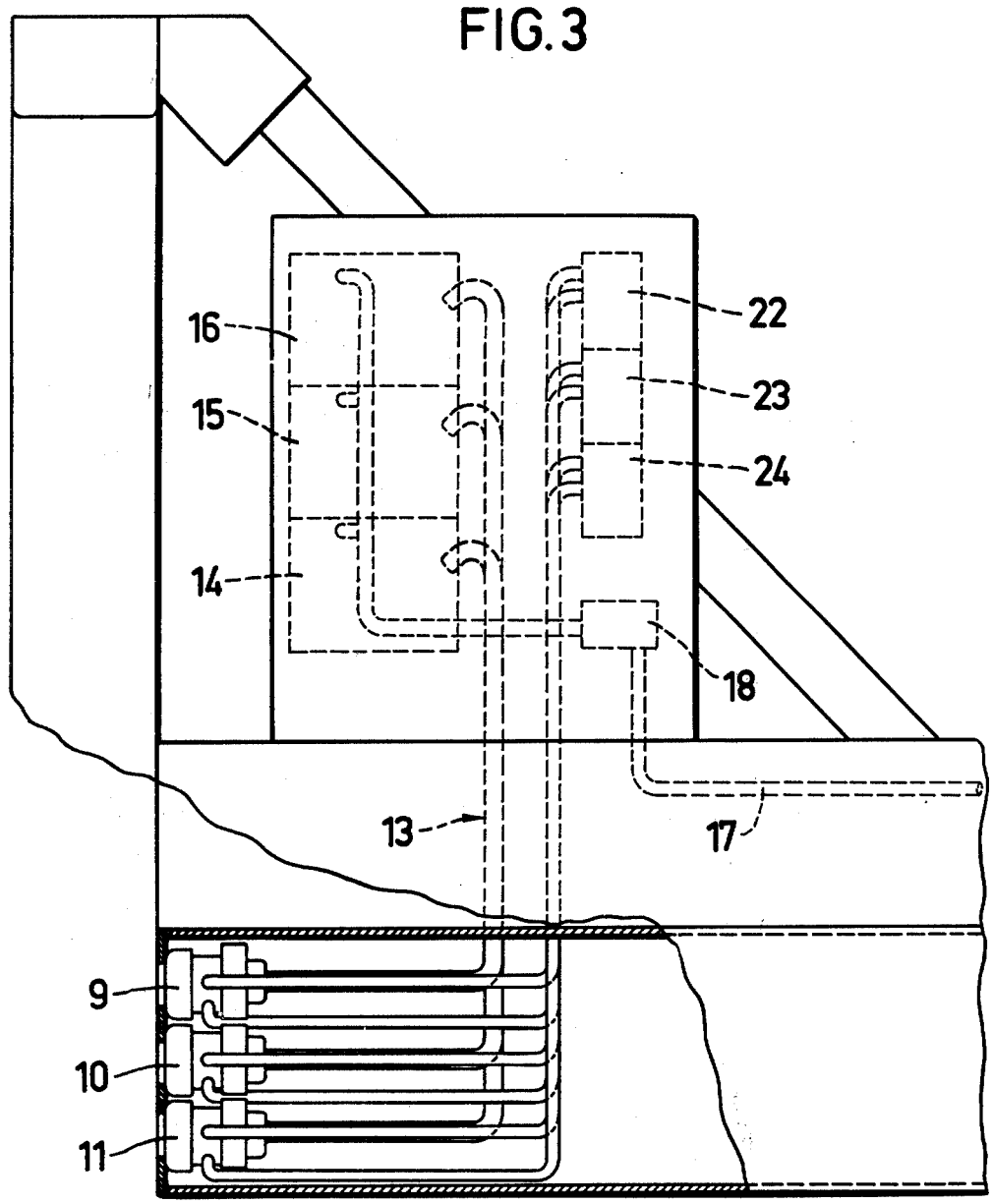
FIG. 3 shows on a larger scale and schematically by way of example an embodiment of the device for carrying out the method according to the invention, applied in the processor according to FIG. 1.

For illustrating the invention, the drawings show a processor, which comprises a delimbing unit 1, a feed mechanism 2 for advancing a tree stem 3 in the direction indicated by the arrow 4 through the processor, and a crosscut saw 5 for cutting the tree stem 3 into different lengths, which are predetermined by the operator of the processor who also in each individual case decides the sortiment, for example saw timber, pulpwood etc., which can be recovered from a tree stem. The different lengths determined by the operator as recoverable from a tree stem are fed by the operator by means of a key-set or the like into a measuring mechanism 6 shown in the form of a measuring roll, which may include members in the form of breakers or the like, each representing a predetermined log length, in order to interrupt the advancing movement of a tree stem when it has been advanced with its root end from a reference point through a distance corresponding to the length set for the first piece. At the same time as the advancing movement of the tree stem is stopped, the crosscut saw 5 is actuated to crosscut the tree stem portion, which is located outside the crosscut saw and constitutes the first piece or log. After completed crosscutting, the crosscut saw returns to its starting position, and simultaneously a new operation step is released by a so-called flag 7, for example subsequent to a mechanic impulse from, for example, the crosscut log, whereby the tree stem, or more precisely its remaining part, is advanced through a distance corresponding to the length set for the second piece or log in the measuring mechanism 6.

According to the present invention, the processor comprises a marking unit generally designated by 8, which comprises at least one and preferably several coloring means 9-11 of such location in the processor, that each crosscut log moves with one end piece adjacent said means, either in a free fall or in a controlled manner, in which latter case a crosscut log may be moved from the position of crosscutting in the processor also in lateral and inclined downward direction. The coloring means may vary in number from one embodiment to another and may be of any imagined form and type. At the embodiment illustrated in the drawings, at which each crosscut log is assumed to leave the position of crosscutting by free fall, said means are shown in the form of three paint sprayers 9, 10 and 11 arranged obliquely one above the other in a frame beam 12 so that the central paint sprayer 10 is located straightly beneath the position of crosscutting in the processor or the tree stem 3. The paint sprayers are connected by conduits 13 (FIG. 4) each to a paint container 14, 15 and 16, respectively, and are driven by compressed air from a compressed air source (not shown), which is supported on a vehicle for moving the processor or on the processor and through a conduit 17 and via a reduction valve 18 is coupled to the paint containers in order to maintain therein the intended pressure for the paint sprayers in the marking unit 8.

The paint containers 14-16 contain different colors, each of which is intended to represent at least one item of predetermined information and for the embodiment in question a predetermined log length to be set in the measuring mechanism 6. Each log length, which can be set in the measuring mechanism, is there represented by one of the aforementioned breakers, three of which are shown in FIG. 4, i.e. one for each coloring means or paint sprayer, and which are there designated by 19, 20 and 21. The breaker 19 is arranged for the same length as the color in the container 14 for the apint sprayer 9, and in like manner the breakers 20 and 21 are arranged for the same length as the colors in the containers 15 and 16, respectively. In order to always mark a crosscut log with the color or, as also is possible at the shown embodiment where the paint sprayers are arranged in separate vertical planes, with the combination of colors intended to indicate the real log length, between each paint sprayer and each combination of paint sprayers, respectively—this latter alternative is not illustrated in the drawings—and the associated breaker in the measuring mechanism 6 a control valve 22, 23 and 24, respectively, is provided. Each such control valve can be activated or pre-set by a signal or an impulse from the associated breaker first when the breaker has stopped the advancing movement of the tree stem 3 after a distance corresponding to the log length set by the processor operator in the measuring mechanism and represented by the breaker in question, whereafter by a signal or an impulse from a limit switch 25 or the like actuated by the crosscut saw 5 in its bottom position or so-called completed crosscut position the associated paint sprayer (or conbination of paint sprayers) is started for marking with intended color the log cross-cut last when this log passes the marking unit. The switch-in or start of the paint sprayers, of course, is adjusted with regard paid to the time required by a crosscut log to move from the crosscutting position in the processor to the paint sprayer in question in the marking unit. When, for example, the advancing movement of the tree stem is stopped by action of the breaker 20, the control valve 23 for the paint sprayer 10 is activated by a signal from said breaker, and when then the advanced portion of the tree stem has been crosscut by the crosscut saw 5, the saw actuates the limit switch 25, which in its turn by a signal causes the control valve 23 to start with adjusted delay the paint sprayer 10 for marking the log crosscut last with the color contained in the paint container 15. The spraying time for the paint sprayers is set by means of a setting mechanism 26 indicated schematically in FIG. 4, in such a manner, that the marking is given the form of a line or of one or more dots in a row.

For the embodiment illustrated in the drawings, it is shown by dash-dotted lines 27 in FIG. 4 that more than three paint sprayers may be comprised in the marking unit 8. In principle, said unit may comprise as may paint sprayers as there are breakers in the measuring mechanism 6. At the embodiment shown where paint sprayers are arranged in separate vertical planes, also a variety of combinations of two or more colors can be obtained by simultaneous operation of the paint-sprayers as indicated above.

The present invention is not restricted to the embodiments described above and shown in the drawings, but it can be varied and modified in many different ways within the scope of the claims. It is not necessary, thus, that each color or combination of two or more colors relates to a predetermined log length or other dimensional size, but can represent any other information, which can be predetermined or recorded with respect to logs crosscut in a processor or the like.

What we claim is:

1. A method of color-marking logs, crosscut in a machine for processing trees, comprising the steps of:
   advancing a log lengthwise into a machine for processing trees past a reference point a first predetermined distance;
   generating a signal indicating that said log has advanced said predetermined distance;
   interrupting the advancing movement of said log in response to said first predetermined distance signal;
   substantially simultaneously with said interruption and in response to said first predetermined distance signal, actuating a crosscut saw means to cut said log at a length corresponding to said first predetermined distance;
   generating a signal indicating that said log cutting has been completed;
   moving an end of said cut log adjacent a means for color-marking said log with a coloring substance;
   presetting said color-marking means to a particular color corresponding to said first predetermined distance signal substantially simultaneously with said interruption and in response to said first predetermined distance signal;
   actuating said color-marking means in response to said log cutting completion signal;
   whereby one end of said cut log is marked with a color corresponding to said first predetermined distance.

* * * * *